US007197379B2

(12) United States Patent
Jackson

(10) Patent No.: US 7,197,379 B2
(45) Date of Patent: Mar. 27, 2007

(54) ANTI-THEFT DEVICE FOR MOTORIZED VEHICLES

(76) Inventor: Donald Wayne Jackson, PO Box 6318, Pearl, MS (US) 39288

( * ) Notice: Subject to any disclaimer, the term of this patent is extended or adjusted under 35 U.S.C. 154(b) by 76 days.

(21) Appl. No.: 10/830,093

(22) Filed: Apr. 23, 2004

(65) Prior Publication Data
US 2004/0260432 A1 Dec. 23, 2004

Related U.S. Application Data

(60) Provisional application No. 60/465,494, filed on Apr. 25, 2003.

(51) Int. Cl.
G06F 17/00 (2006.01)
B60R 25/10 (2006.01)
(52) U.S. Cl. ........................................ 701/1; 340/426.1
(58) Field of Classification Search ................ 701/1; 340/426.1, 426.21, 426.36, 5.31, 10.42
See application file for complete search history.

(56) References Cited

U.S. PATENT DOCUMENTS

| 5,349,329 A * | 9/1994 | Smith ..................... 340/539.21 |
| 6,400,042 B1 * | 6/2002 | Winner et al. ............. 307/10.5 |
| 6,570,486 B1 * | 5/2003 | Simon et al. ................ 340/5.1 |

* cited by examiner

Primary Examiner—Thu V. Nguyen
(74) Attorney, Agent, or Firm—Stites & Harbison PLLC; Ross F. Hunt, Jr.

(57) ABSTRACT

A anti-theft system is provided which prevents a vehicle equipped with the system from being driven away more than a predetermined distance. The system includes a first electronic control device which is mounted in the vehicle which control continued operation of the vehicle after the vehicle is started, e.g., controls opening of the ignition or fuel injection circuits. A second electronic control device, adapted to be worn by a person authorized to use the vehicle, receives a characteristic signal from the first device and transmits a return signal in response thereto. A control circuit of the first device calculates the distance between the two devices based on the returned signal and disables vehicle operation when the distance is greater than the predetermined distance.

20 Claims, 8 Drawing Sheets

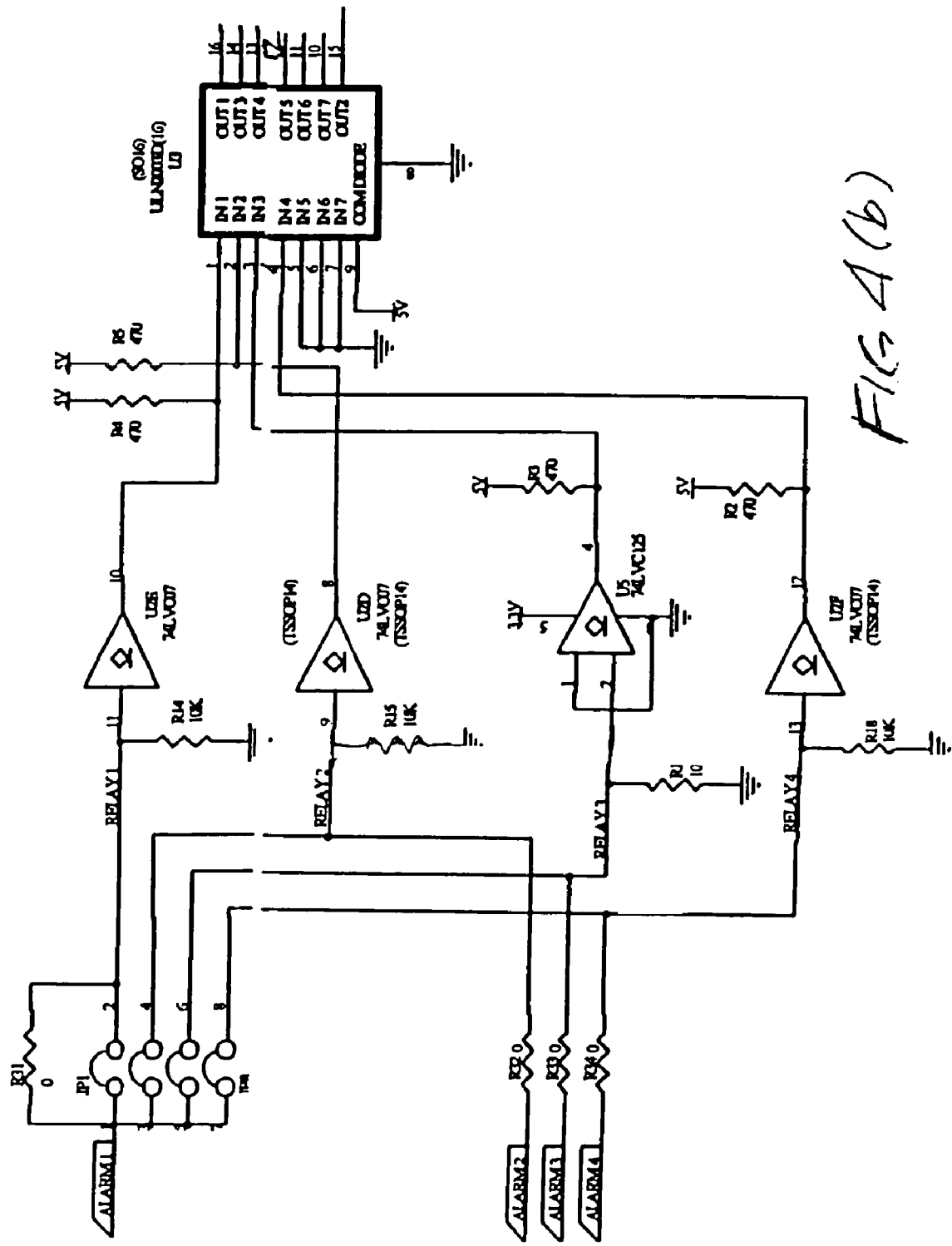

ANTI-THEFT DEVICE FOR MOTORIZED VEHICLES

CROSS-REFERENCE TO RELATED APPLICATIONS

This application claims benefit of U.S. Provisional Application No. 60/465,494, filed Apr. 25, 2003.

FIELD OF THE INVENTION

The present invention relates to devices and systems for preventing unauthorized use of a motor vehicle and, more particularly, to an anti-theft device or system which automatically disables the vehicle under certain conditions to prevent the vehicle from being driven away and, in a preferred embodiment, to prevent use of the vehicle equipment.

BACKGROUND OF THE INVENTION

Although it will be understood that the present invention is not limited to such an application, one important application of the invention is in the field of emergency response vehicles such as police cars. The theft rate of such vehicles is on the increase and the potential use of such stolen vehicles in terrorist activities is a dangerous prospect particularly because people tend to accept the legitimacy of the presence of such vehicles at sites where ordinary vehicles would raise suspicions.

Another aspect of the problem is that police cars and other emergency vehicles are often left running or left with the ignition key in while the policeman or other emergency response personnel tends to whatever task is at hand. For example, the police may temporarily leave a police car running or the keys in the car or otherwise unsecured when investigating an incident on the side of a highway or in another situation where only a quick stop is made. Further, criminals, terrorists or others may simply break into the car and "hot wire" the car or effect other starting thereof to enable the car to be driven off and may also use the equipment in the car (radio, guns from the gun rack, etc.) for their own purposes.

Although various devices have been developed for protecting against the unauthorized use of vehicles including emergency and public works vehicles, these have proved to be of limited effectiveness in some situations particularly where the criminal or terrorist is highly motivated or otherwise determined to break in and drive off the vehicle.

SUMMARY OF THE INVENTION

In accordance with the invention, there is provided an anti-theft device or system for preventing a protected vehicle from being driven away. In the latter regard, it should be understood that the system of the invention is not designed to prevent and does not prevent an initial taking of the vehicle but rather prevents the vehicle from being driven away more than a predetermined distance (which is typically set to be from 10 feet to one-half mile). Thus, the system of the invention prevents loss of property and even loss of life. For example, the system of the invention, when used correctly, ensures that the protected vehicle will never be involved in a high-speed chase that could potentially claim innocent lives.

An important advantage of the basic system of the invention is that the system is completely automatic, i.e., there are no buttons to push, no codes to remember and nothing to be done to activate the system or reactivate the system. As discussed below, the authorized driver of the vehicle simply wears one part of the system, referred to as the "reflector," and this part is preferably disguised as an ordinary pager or like electronic unit.

In accordance with one aspect of the invention, there is provided an anti-theft system for vehicles, the system comprising:

a first electronic control device, adapted to be mounted in a vehicle to be protected, for controlling continued operation of the vehicle after the vehicle is started, said first control device including a transmitter/receiver for, when the system is active, transmitting a characteristic signal; and a second electronic control device adapted to be worn by a person authorized to use the vehicle and including a transmitter/receiver for receiving said characteristic signal and for transmitting a return signal to the transmitter/receiver of the first control device in response thereto;

said first electronic control device including a control circuit for calculating the distance between the first and second control devices based on the returned signal and for disabling vehicle operation when said distance is greater than a predetermined distance.

Preferably, the control circuit includes a relay, including relay contacts connected in the electrical system of the vehicle, for, when energized, opening said contacts to open the vehicle electrical system. In one important embodiment, the electrical system includes an ignition circuit and the relay contacts are connected in the ignition circuit to control disconnection of the ignition circuit. In another important embodiment, the electrical system includes a fuel injector control circuit and the relay contacts are connected in the fuel injector control circuit so as to control operation of the vehicle fuel injectors. In yet another important embodiment, the electrical system comprises a power supply circuit for the fuel supply system of the vehicle and the relay contacts control opening of said power supply circuit.

Preferably, the second control device includes emergency shutoff means operable by the wearer of the second control device for, when activated, causing transmission of a cutoff signal to said first control device to effect cutoff of the vehicle operation.

In an advantageous implementation, the second control device includes a battery-powered power supply having a predetermined operational lifetime and monitoring means for monitoring the hours of use of the power supply and for producing an alarm output when the hours of use approach the predetermined lifetime.

Preferably, the control circuit automatically resets the system to enable vehicle operation if the distance between the first control device on the vehicle and the second control device becomes less than said predetermined distance.

The second control device preferably includes control means operable by the wearer of the second control device for, when activated, disabling, after passage of a predetermined time period, the vehicle and all vehicle power options.

Advantageously, the system further includes an override function operable by the wearer of the second control device to enable operation of the vehicle when in park, the system providing for automatic disabling of at least one vehicle function when the vehicle is taken out of park and the vehicle is more than said predetermined distance from the second control device.

Preferably, the control circuit further includes control means, remotely operable by the wearer of the second control device, for disabling at least one further electrically controlled onboard device when the vehicle operation is disabled. The at least one onboard device advantageously comprises at least one of vehicle communication equipment, a siren, an onboard computer and an electrically operated gun rack.

Preferably, the control circuit includes control means, remotely operable by the wearer of the second control device, for enabling at least one electrically controlled onboard device when the vehicle operation is enabled. The at least one onboard device comprises at least one of emergency light bars, an emergency signaling device, a camera system, and a recording device.

Advantageously, the characteristic signal and return signal both comprise radio signals.

In a preferred implementation the second control device is of a size and an outward appearance similar to that of a conventional pager device.

In accordance with a further aspect of the invention, there is provided a system for preventing a vehicle protected by the system from being driven away by unauthorized persons, the system comprising:

a first electronic control device, adapted to be mounted in a vehicle to be protected, for controlling continued operation of the vehicle after the vehicle is started, said first control device including a transmitter/receiver for transmitting a characteristic radio frequency signal; and a second electronic control device adapted to be worn by a person authorized to use the vehicle to be protected and including a transmitter/receiver for receiving said characteristic signal and for, in response thereto, immediately transmitting a return radio frequency signal to the transmitter/receiver of the first control device;

said first electronic control device including a control circuit for calculating the distance between the first and second control devices based on the returned signal and for disabling vehicle operation when said distance is greater than a predetermined distance, the control circuit also disabling vehicle operation when a return signal is not received from the second control device.

As above, the control circuit includes a relay, including relay contacts connected in the electrical system of the vehicle, for, when energized, opening the contacts to open the vehicle electrical system. Also as above, in different, important embodiments, the electrical system includes an ignition circuit and the relay contacts are connected in the ignition circuit to control disconnection of the ignition circuit, the electrical system includes fuel injector control circuit and the relay contacts are connected in the fuel injector control circuit so as to control operation of the vehicle fuel injectors, and/or the electrical system includes a power supply circuit for the fuel supply system of the vehicle and the relay contacts control opening of the power supply circuit.

Further features and advantages of the present invention will be set forth in, or apparent from, the detailed description of preferred embodiments thereof which follows

BRIEF DESCRIPTION OF THE DRAWINGS

FIGS. 4(a), 4(b), 4(c), 4(d), 4(e) and 4(f) are schematic circuit diagrams of one preferred embodiment of a receiver that can be employed by the present invention.

DESCRIPTION OF THE PREFERRED EMBODIMENTS

Figure 1:
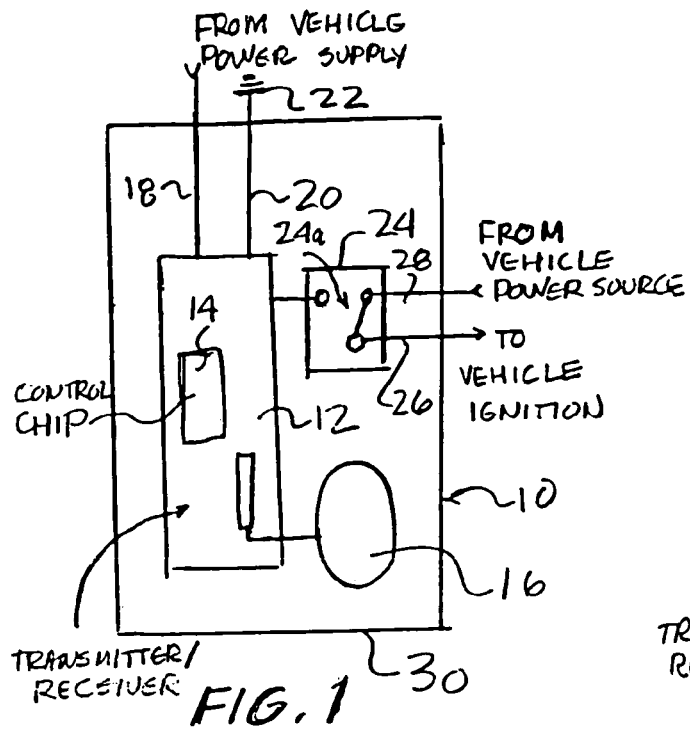
FIG. 1 is a schematic cross-sectional view of a first control device of the system of the invention, which is, in use, mounted in the protected vehicle and which is constructed in accordance with a preferred embodiment.

Referring to FIG. 1, there is shown a schematic block form representation of the first electronic control device or unit, which is generally denoted 10. Control unit 10 includes a transmitter/receiver circuit board 12 including a programmed control chip 14, and is connected to an antenna 16.

The transmitter/receiver circuit 12 is powered from the vehicle power supply and, in this regard, is connected by a wire or other connection 18 to the vehicle power supply (typically 12 volts) and by a wire or other connection 20 to the vehicle ground denoted 22.

Transmitter/receiver circuit 12 is further connected to a relay 24 which is, in this embodiment, connected in the ignition circuit (not shown) between the vehicle ignition power supply connection 26 and the vehicle ignition coil connection 28. As indicated above, a relay corresponding to relay 24 can also be used in other vehicle electrical circuits such as the fuel injector control circuit, which, when open-circuited responsive to opening of the contacts 24a of relay 24, cause vehicle operation to be disabled or terminated.

All of the electronic control circuitry described above is housed in a case or housing 30 of unit 10 which is, in use, mounted within the vehicle to be protected at a suitable location.

Figure 2:
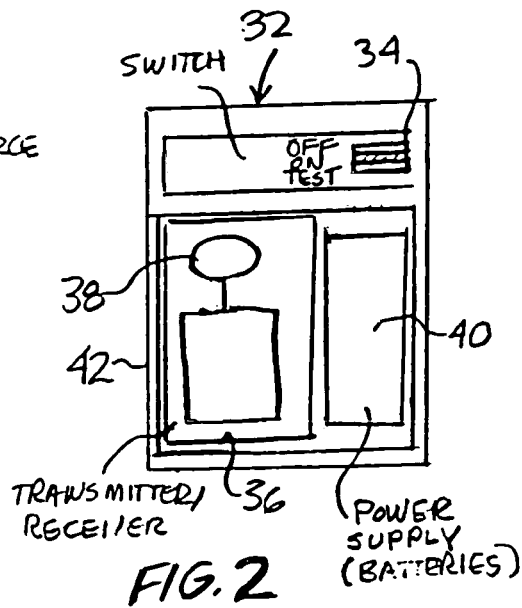
FIG. 2 is a schematic cross-sectional view of a second device of the system of the invention, which is, in use, adapted to be worn by an authorized user of the protected vehicle and which is constructed in accordance with a preferred embodiment.

Referring to FIG. 2, a second electronic control device or unit, also referred to herein as a "reflector," is indicated at 32. Unit 32 includes a control switch 34 including on, off and test positions, a transmitter/receiver circuit board 36 and an associated antenna 38, and a portable power supply 40 preferably comprising a pair of batteries or the like. The unit 32 includes a case or housing 42 which is designed to be worn on the belt of a user and is disguised to have the appearance of an ordinary pager or like electronic device. In other words, housing 42 is of a size, shape and outward appearance of an ordinary pager or like device so as to be normally undetectable as a control device.

The transmitter 12 of main unit 10 is used to transmit a characteristic signal preferably in the form of a radio frequency "ping" or pulse transmitted at equally spaced, timed intervals. This signal is received by the receiver 36 of the second, "reflector" unit 32 which processes the received signal and transmits a return signal back to the first control unit 10. The control chip 14 of unit 12 processes the return signal and, based thereon, calculates the distance between the units 12 and 32 and thus distance between the vehicle and the wearer of the second, "reflector" unit 32. The chip 14 also determines whether this distance is greater than a preset or predetermined distance which, as indicated above, is typically set to be a distance from about 10 feet to about one-half mile. If the present distance is exceeded, a control signal is produced which causes the relay contacts 24a of relay 24 to open, thus opening the connection between the vehicle power source (connector 28) and the vehicle ignition circuit (connector 26) to thereby disable the vehicle.

It is noted that if return signal is not received by the transmitter/receiver 12, this will be treated in the same way as a signal indicating the exceeding of the preset distance, and control chip 14 will cause relay 24 to open under this condition as well.

In one embodiment of transmitter/receiver 12, when a companion transmitter/receiver 36 is in range, transmitter/receiver 12 is in an operational mode such that any electrical circuits controlled thereby function as usual. If the signals from transmitter/receiver 36 can no longer be heard by transmitter/receiver 12, internal relays, corresponding to relay 24, are triggered, thereby controlling the aforementioned electrical circuits. The receiver 12 includes jumper selectable settings (not shown) for setting the transmitter reporting interval, i.e., setting the maximum time that the receiver 12 must wait until receiver 12 hears from companion transmitter 36 before receiver 12 triggers relay(s) 24. If receiver 12 receives a signal during this interval, an internal counter (not shown) is reset, thereby starting a new period. The receiver 12 is programmed so as to listen to only one specific transmitter. When the transmitter signal is received, i.e., when receiver 12 hears from transmitter 36, the received message is processed to determine if particular bits in the message have been set. If so, the relay(s) 24 are triggered. This mode of operation occurs in response to an "activate now" or "panic" mode of the transmitter 36 described below. As is discussed in more detail below, this switch-controlled mode is used in emergency conditions to disable the vehicle.

As explained above, a relay or like switching device actuated by control chip 14 can be used in other ways to disable the vehicle after the separation distance exceeds the present distance including, inter alia, disabling the fuel injectors, disabling the fuel power supply or disabling any other function that will result in terminating or disabling of vehicle operation.

In addition to disabling vehicle operation, in a preferred, optional embodiment, control chip 14 also acts to both disable other functions and enable different functions. Thus, by controlling other relays or switches (not shown in FIG. 1) the computer chip 12 can be used to turn off the vehicle radio communication equipment, the siren, the electronic shotgun rack and like unite on the vehicle so as to deny an unauthorized user access to these units or equipment. In addition, with an optional "power on" feature, computer chip 12 can be used to enable emergency light bars, camera systems, recorders and/or any other equipment.

It is important to understand that when the protected vehicle in which the first unit 10 is located and the second unit 32 are no longer separated by a distance greater than said separation distance, the status quo is reestablished, i.e., the disabled functions are enabled and the enabled functions are disabled.

As indicated above, the system of the invention operates in its basic mode automatically, without any buttons to push or codes to remember. However, in an important implementation, switch 34 of unit 32 or another switch associated with the unit, can be used by the wearer of the unit, i.e., the authorized driver of the protected vehicle, to control other functions. Before considering these other functions, the "automatic" function will be briefly reviewed. As indicated above, with the automated function, if the vehicle is driven out of the preset perimeter (i.e., beyond a circular perimeter having a radius equal to the preset distance), the main computer chip 14 will activate the disabling and enabling functions described above. Further, when the vehicle reenters the perimeter the computer chip 14 resets all functions so that vehicle can be driven by the authorized driver (the wearer of unit 32) in a normal manner. This automatic function is for general use and protects the vehicle at all times.

An "activate now" function involves moving switch 34 to a corresponding position, e.g., an "activate" position, and enables the authorized driver to immediately activate the main computer control chip 14, and all disabling and enabling functions, by means of signal from "reflector" unit 32. Preferably, the switch position is such that this "activate now" function is selected by pushing a switch (corresponding to switch 34) located on top of the "reflector" 32 all the way to a position opposite its automatic "on" position (indicating by the "test" position in FIG. 2).

This "activate now" function is used to immediately disable the vehicle in the event of an emergency.

For an "off" function, the switch 34 is moved to the "off" position and the vehicle is disabled after a very short delay (e.g., 15 seconds) until the switch 34 is placed in the "on" position again. In a preferred embodiment, the "off" position is the center position for switch 34. This function keeps the vehicle in the disabled state and with all "power off" options turned off. This function is particularly helpful when the system comprising units 10 and 32 is not in service for an extended period of time and differs from the "activate now" function in that the "off" function requires a predetermined time period (e.g., 15 seconds) for disablement takes place.

The system also preferably includes a "park in service" override which is designed to ensure that the vehicle can remain running (operative) while service is required and the authorized driver is away from the vehicle. For example, this override can be used when a police officer is working an accident scene and may for some unforeseen reason need to move away from the vehicle (patrol car) a distance greater than the preset distance. This also protects the vehicle power supply. In this mode, the vehicle will remain running while all of the other "power on" and/or "power off" options are triggered. On the other hand, if the vehicle is taken out of park while the authorized user (e.g., a police officer) is outside of the preset perimeter, the fuel system and/or ignition system will be automatically disabled as in the "automatic" mode.

As indicated above and is shown to some extent in FIG. 2, control device 32 is generally of the size, shape and outside appearance of an ordinary pager or like electronic device and is preferably adapted to be worn on the belt or other worn on the person by a clip or the like (not shown).

Figure 4F:
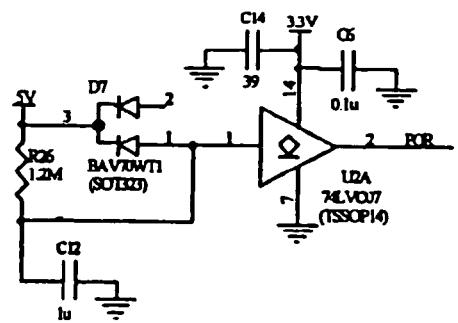
Figure 3A:
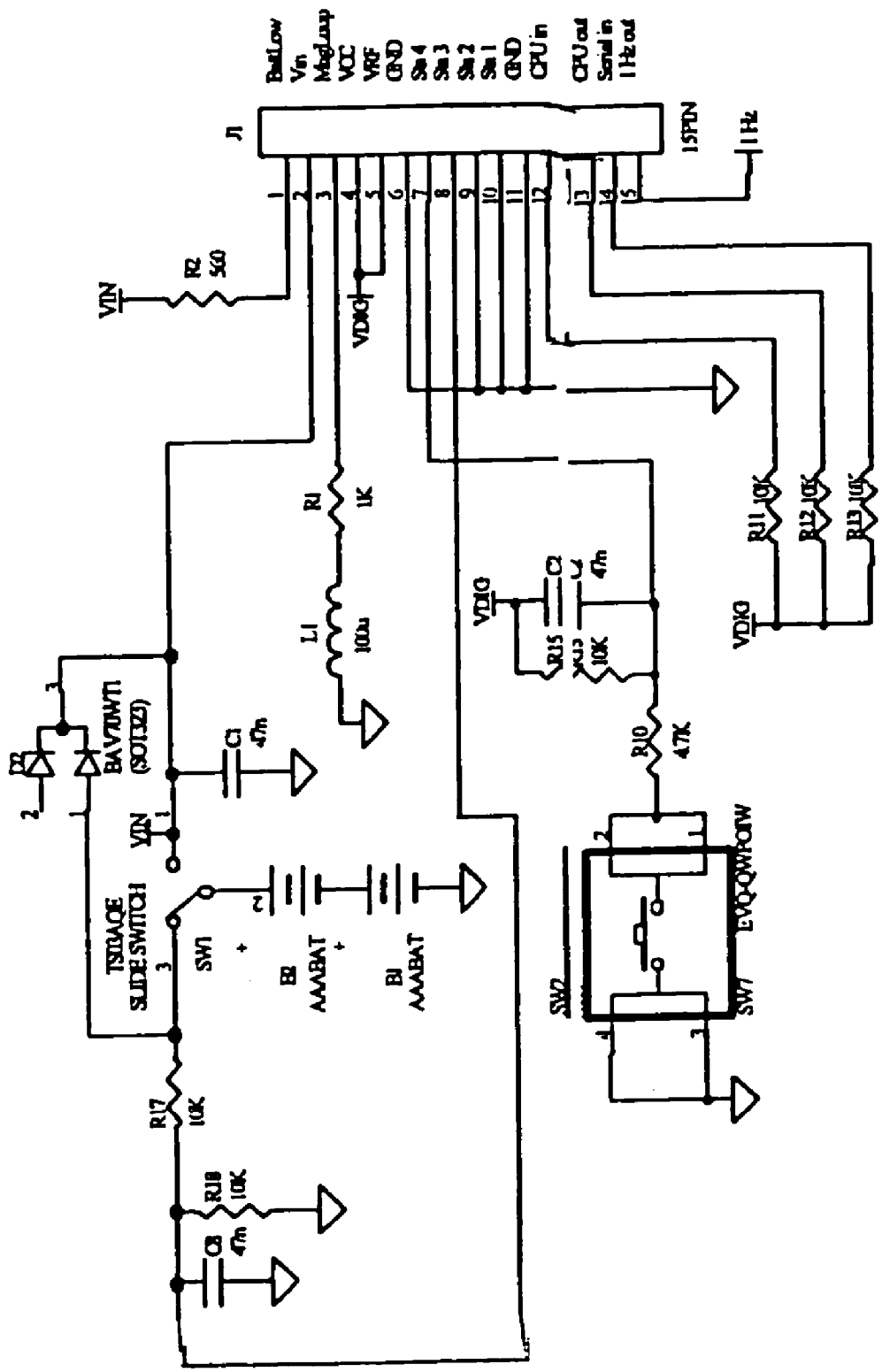
FIGS. 3(a) and 3(b) are schematic circuit diagrams of one preferred embodiment of a transmitter that can be employed by the present invention.
Figure 3B:
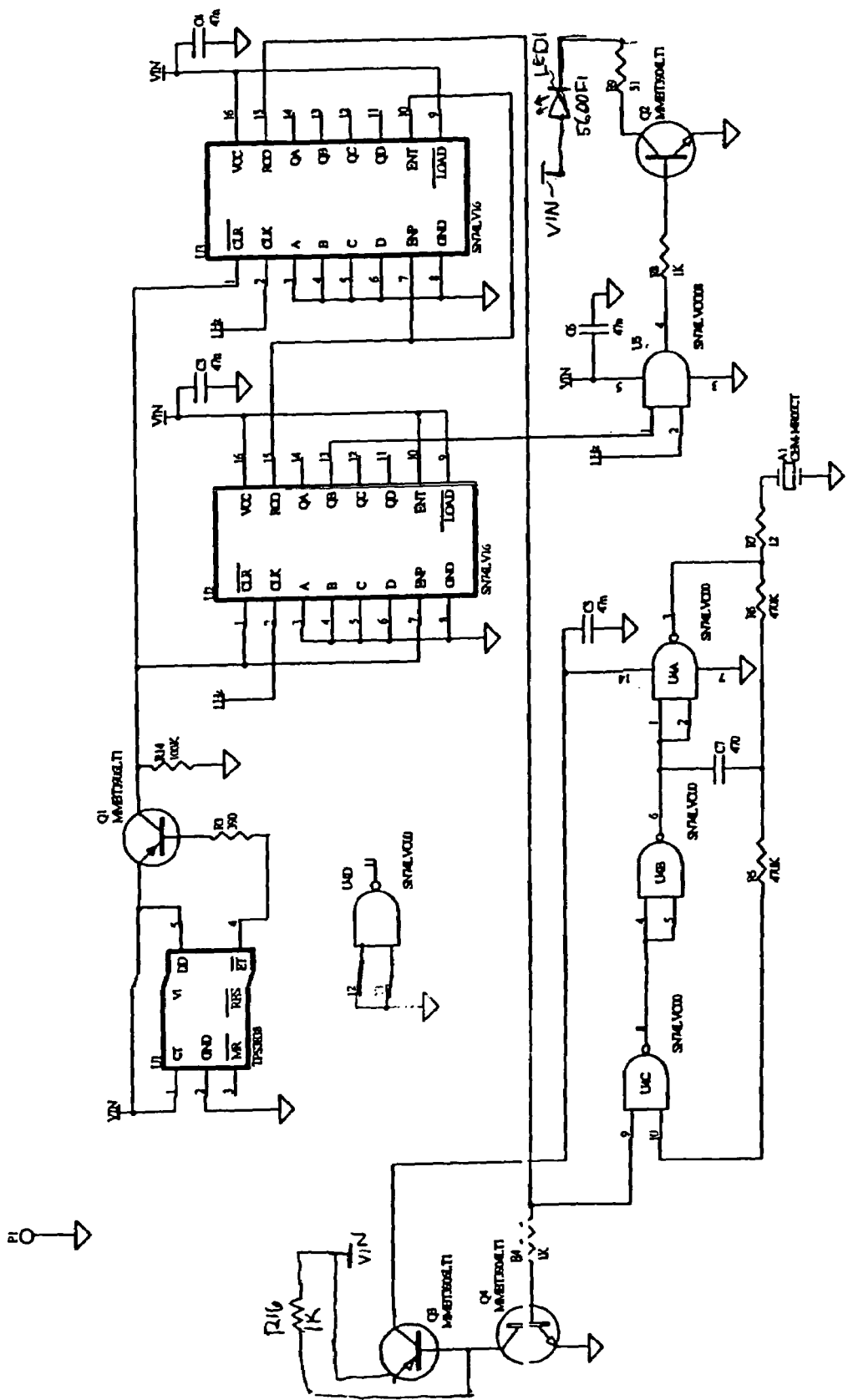
Figure 4A:
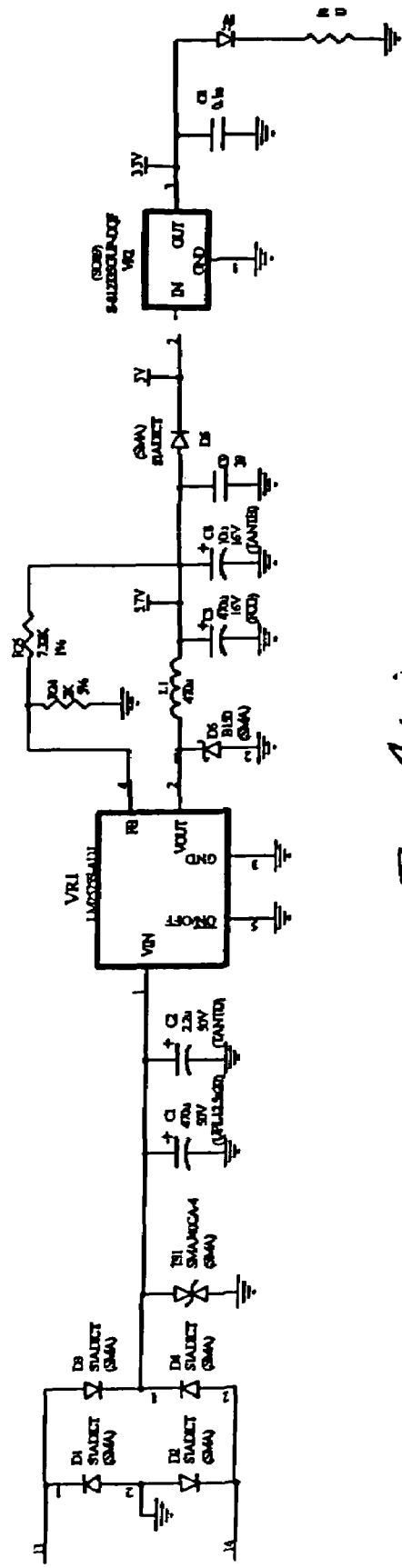
Figure 4C:
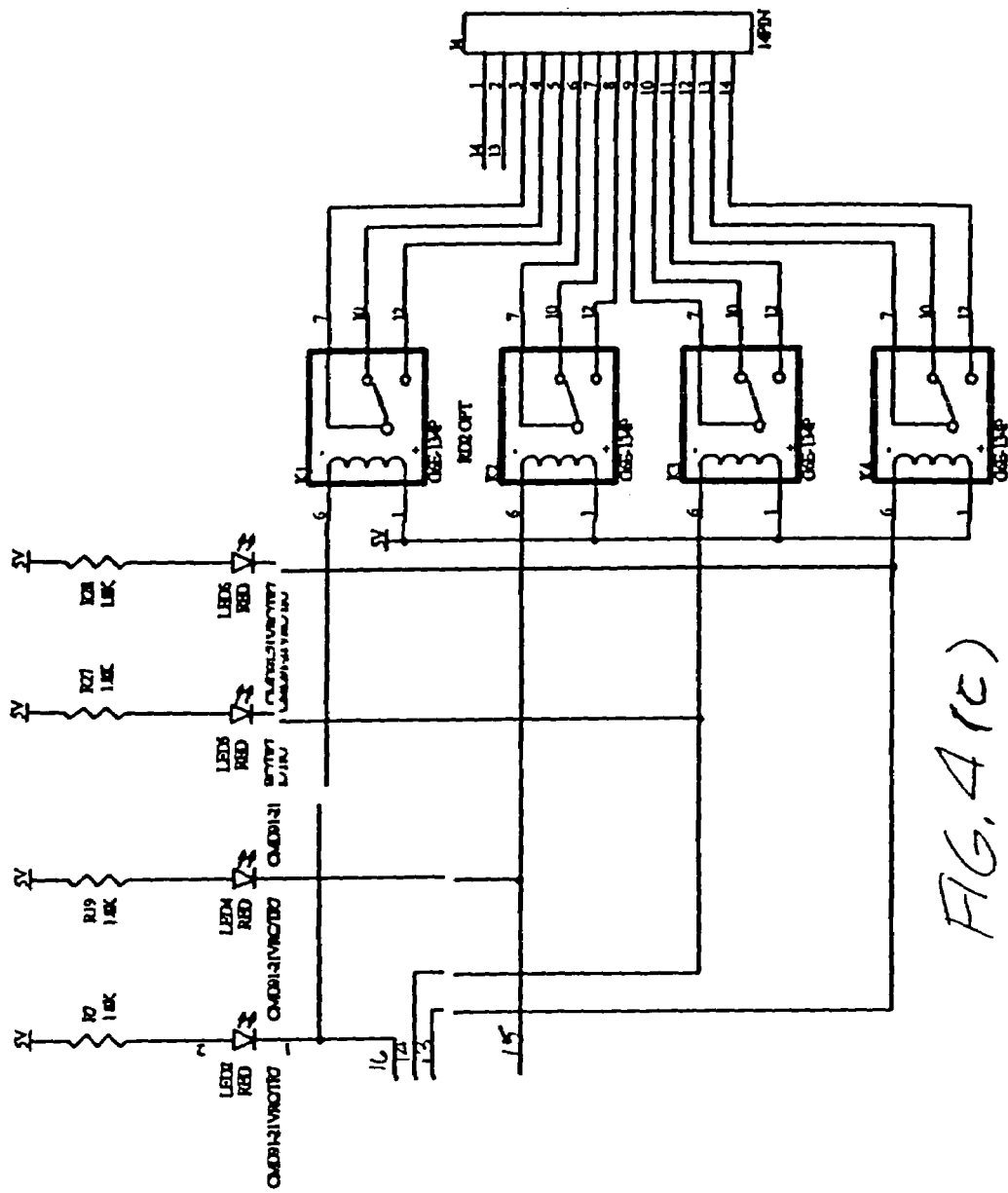
Figure 4D:
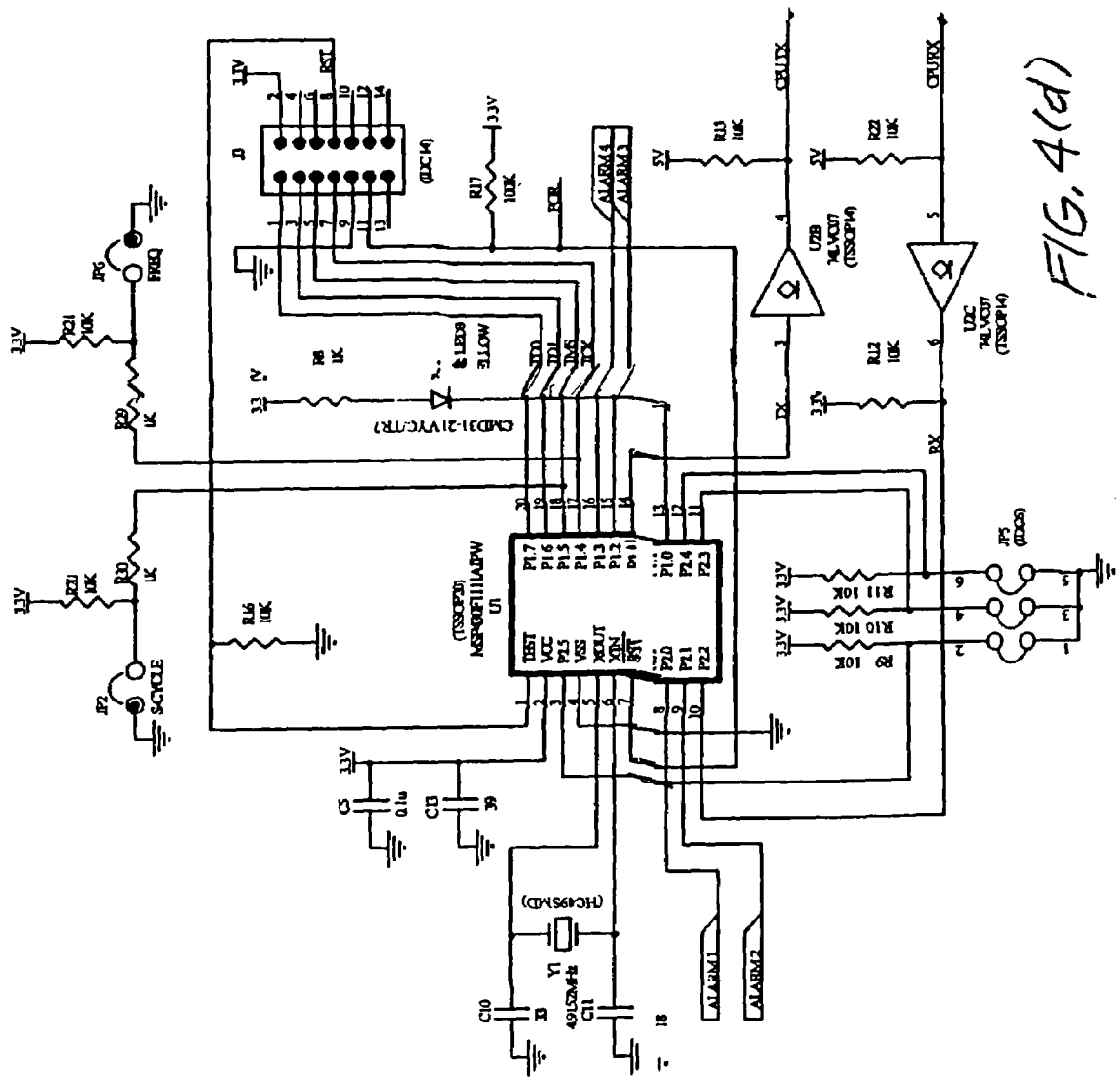
Figure 4E:
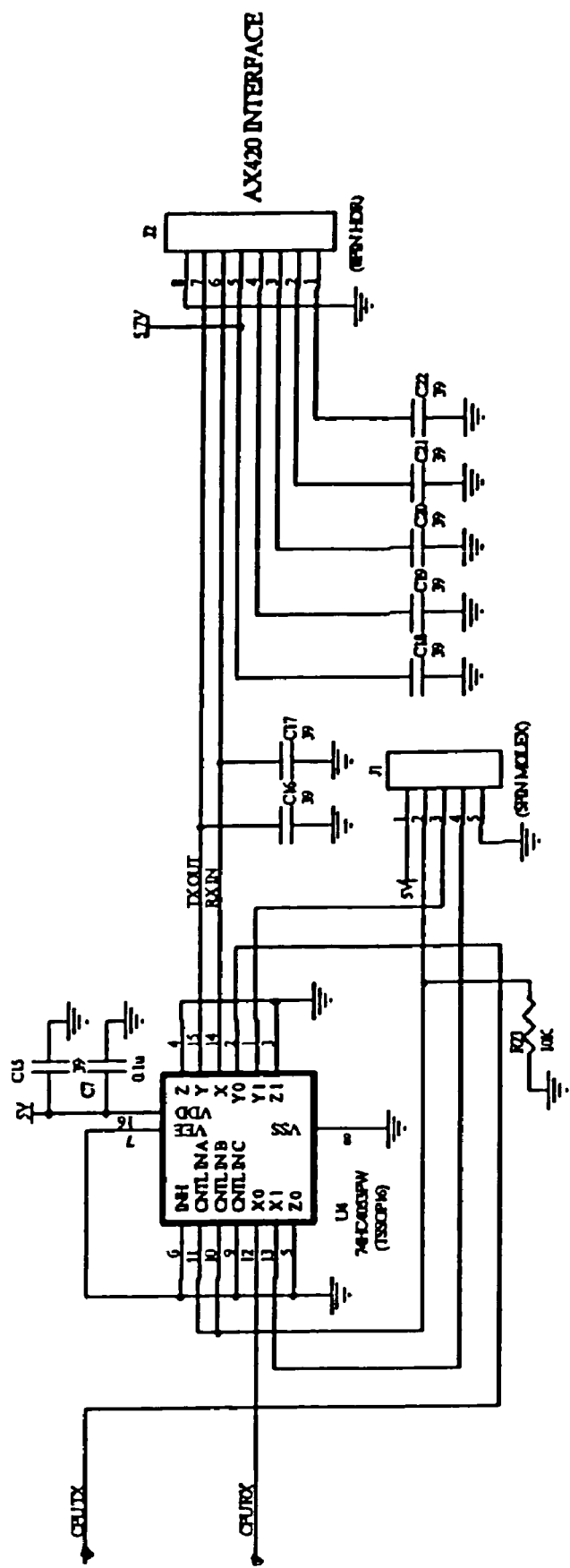

Although, as indicated above, different transmitters and receivers can be used, circuit diagrams of one preferred embodiment of the transmitter are shown in FIGS. 3(a) and 3(b) and circuit diagrams of one preferred embodiment of the receiver are shown in FIGS. 4(a), 4(b), 4(c), 4(d), 4(e) and 4(f) wherein FIGS. 4(a) and 4(b) together form one circuit and wherein FIGS. 4(d) and 4(e) form one circuit. The transmitter is described in part in, and/or covered by, the following U.S. Pat. No. 4,977,577; U.S. Pat. No. 5,119,396; U.S. Pat. No. RE 35829; and U.S. Pat. No. 5,408,217. The receiver is described in part in, and/or covered by, the following U.S. Pat: U.S. Pat. No. 5,095,493; U.S. Pat. No. 5,598,427; U.S. Pat. No. 5,953,368; U.S. Pat. No. 5,377,222; U.S. Pat. No. 5,067,136; U.S. Pat. No. 6,031,883; U.S. Pat. No. 5,408,217; U.S. Pat. No. 5,457,713; U.S. Pat. No. 6,111,911; U.S. Pat. No. 5,668,828; U.S. Pat. No. 5,999,561; and U.S. Pat. No. 5,920,589. Descriptions and component values for the various circuit components of the transmitter and receiver, respectively, are listed in Table 1 and Table 2 below.

TABLE 1

| COMPONENT | DESCRIPTION |
| --- | --- |
| C7 | 470 pF, +/−5%, 0603, 50 V, NPO, CERAMIC CHIP CAPACITOR |
| C1, C2, C3, C4, C5, C6 | 47 nF, +/−10%, 0603, 16 V, X7R, CERAMIC CHIP CAPACITOR |
| R7 | 12 OHM, 1/10 W, 5%, 0603 CARBON FILM RESISTOR |
| R9 | 51 OHM, 1/10 W, 5%, 0603 CARBON FILM RESISTOR |
| R2 | 560 OHM, 1/10 W, 5%, 0603 CARBON FILM RESISTOR |
| R1, R4, R8, R16 | 1K OHM, 1/10 W, 5%, 0603 CARBON FILM RESISTOR |
| R10 | 4.7K OHN, 1/10 W, 5%, 0603 CARBON FILM RESISTOR |
| R11, R12, R13, R15 | 10K OHM, 1/10 W, 5%, 0603 CARBON FILM RESISTOR |
| R5, R6 | 100K OHM, 1/10 W, 5%, 0603 CARBON FILM RESISTOR |
| L1 | 1000 nH, +.−10%, EPOXY DIPPED INDUCTOR 43LR104 |
| LED1 | RED RIGHT ANGLE THRUHOLE LED |
| SW1 | SLIDE SWITCH THRUHOLE |
| SW2 | THIN PUSHBUTTON SWITCH MOMENTARY |
| Q1, Q3 | MMBT3906LT1 PNP TRANSISTOR SOT-23 |
| Q2, Q4 | MMBT3904LT1 NPN TRANSISTOR SOT-23 |
| J1 | AX620 TRANSMITTER |
| U1 | RESET CHIP 2.25 v TRIP SOT23-5 |
| U2, U3 | 4 BIT SYNCHRONOUS BINARY COUNTER TSSOP14 |
| U4 | 2 INPUT NAND GATE TSSOP14 |
| U5 | 2 INPUT AND GATE SOT23-5 |
| A1 | PIEZO ELEMENT RADIAL LEAD |

TABLE 2

| REF DES | DESCRIPTION | QTY |
| --- | --- | --- |
| C1 | CAP RAD AL 470 UF 50 V +/−20% | 1 |
| C10 | CAP 0603 CER 18 PF 50 V COG +/−5% | 1 |
| C11 | CAP 0603 CER 18 PF 50 V COG +/−5% | 1 |
| C12 | CAP 0603 CER 1 UF 16 V X7R +/−10% | 1 |
| C2 | CAP D-PKG TAN 2.2 UF 50 V +/−20% | 1 |
| C3 | CAP SMT AL 470 UF 16 V +/−20% L-ESR | 1 |
| C4 C5 C6 C7 | CAP 0603 CER 0.1 UF 50 V X7R +/−20% | 4 |
| C8 | CAP B-PKG TAN 10 UF 16 V +/−20% | 1 |
| C9 C13 C14 C15 C16 C17 C18 C19 C20 C21 C22 | CAP 0603 CER 39 PF 50 V COG +/−5% | 11 |
| D1 D2 D3 D4 D5 | DIO SMA 1 A 50 V GLASS PASS | 5 |
| D6 | DIO SMA B150 50 V 1 A SCHOTTKY | 1 |
| D7 | DIO SOT-323 BAV70 DUAL SW COM CATH | 1 |
| J1 | CONN HDR TH 5P M STR.100 FRICTLK | 1 |
| J2 | SKT 1 × 8 RA ½" STDF | 1 |
| J3 | CONN HDR TH 2 × 7 M STR.100 | 1 |
| JP2 JP6 | CONN HDR TH 1 × 2 M STR.100 | 1 |
| JP1 | CONN HDR TH 2 × 4 M STR.100 | 1 |
| JP5 | CONN HDR TH 2 × 3 M STR.100 | 1 |
| J4 | CONN HDR 14 CKT R/A MINI-FIT JR | 1 |
| K1, K2, K3, K4 | LOW SENSE RELAY SPDT 5 VDC 1A | 4 |
| L1 | IND SMT 470 UH +/−20% POWER | 1 |
| LED1 | LED GRN CLEAR Z-BAND TR7 | 1 |
| LED2, LED4, LED5, LED6 | LED RED CLEAR Z-BAND TR7 | 4 |
| LED3 | LED YEL CLEAR Z-BAND TR7 | 1 |
| R1, R9, R10, R11, R12, R13, R14, R15, R16, R18, R20, R21, R22, R23 | RES 0603 TKF 10K 5% 1/16 W | 14 |
| R17 | RES 0603 TKF 100K 5% 1/16 W | 1 |
| R6, R8, R29, R30 | RES 0603 TKF 1K 5% 1/162 | 4 |
| R24 | RES 0603 TKF 2K 5% 1/10 W | 1 |
| R25 | RES 0603 TKF 7.32K 1% 1/10 W | 1 |
| R26 | RES 0603 TKF 1.2M 5% 1/10 W | 1 |
| R31, R32, R33, R34 | RES 0603 TKF 0 R 5% 1/16 W | 4 |
| R2, R3, R4, R5 | RES 0805 TKF 470 R 5% 1/8 W | 4 |
| R7, R19, R27, R28 | RES 0603 TKF 1.8 K 5% 1/10 W | 4 |
| TS1 | DIO D0214AC TVS 40 V 1 A BI-DIR | 1 |
| U1 | MCTL TSSOP-20 MSP430F | 1 |
| U2 | IC 74LVC07 TSSOP-14 HEX BUFFER | 1 |
| U3 | 500 mA, 50 V, 7 CHANNEL, NPN | 1 |
| U4 | IC TSSOP-16 74HC4053 ANALOG MUX | 1 |
| U5 | IC 74LVC125 SOT23-5 HEX BUFFER | 1 |
| VR1 | REG TO-263-5 LM2575 ADJ 1A | 1 |
| VR2 | REG SOT-89-3 S-81233 3.3 V +/−2.4% | 1 |
| Y1 | 4.9152 Mhz crystal 18 pf 30/50 ppm | 1 |

TABLE 2-continued

| REF DES | DESCRIPTION | QTY |
|---|---|---|
| | SMD | |
| | PCB 2 layer | 1 |
| | SHUNT 0.100 BLK | 1 |
| | AX420 RECEIVER | 1 |
| | PLSTC HSG BLACK | 1 |
| | CONN HDR 14 CKT HOUSING R/A MINI-FIT JR | 1 |
| | SOCKET PIN 18–24AWG MOLEX MINI-FIT | 14 |

Although the invention has been described above in relation to preferred embodiments thereof, it will be understood by those skilled in the art that variations and modifications can be effected in these preferred embodiments without departing from the scope and spirit of the invention.

What is claimed:

1. An anti-theft system for vehicles, said system comprising:
a first electronic control device, adapted to be mounted in a vehicle to be protected, for controlling continued operation of the vehicle after the vehicle is started, said first control device including a transmitter and receiver for, when the system is active, transmitting a characteristic signal; and
a second electronic control device adapted to be worn by a person authorized to use the vehicle and including a transmitter and receiver for receiving said characteristic signal and for transmitting a return signal to the transmitter and receiver of the first control device in response thereto;
said first electronic control device including a control circuit for determining the distance between the first and second control devices based on the returned signal and for disabling said continued operation of the vehicle when said distance is greater than a predetermined distance, said second control device being of a size and an outward appearance similar to that of a conventional pager device.

2. An anti-theft system according to claim 1 wherein said control circuit includes a relay, including relay contacts connected in the electrical system of the vehicle, for, when energized, opening said contacts to open the vehicle electrical system.

3. An anti-theft system according to claim 2 wherein said electrical system includes an ignition circuit and wherein said relay contacts are connected in the ignition circuit to control disconnection of the ignition circuit.

4. An anti-theft system according to claim 2 wherein said electrical system includes fuel injector control circuit and wherein said relay contacts are connected in said fuel injector control circuit so as to control operation of the vehicle fuel injectors.

5. An anti-theft system according to claim 2 wherein said electrical system includes a power supply circuit for the fuel supply system of the vehicle and wherein said relay contacts control opening of said power supply circuit.

6. An anti-theft system according to claim 1 wherein said second control device includes emergency shutoff means operable by the wearer of the second control device for, when activated, causing transmission of a cutoff signal to said first control device to effect cutoff of the vehicle operation.

7. An anti-theft system according to claim 1 wherein said second control device includes a battery-powered power supply having a predetermined operational lifetime and monitoring means for monitoring the hours of use of the power supply and for producing an alarm output when the hours of use approach said predetermined lifetime.

8. An anti-theft system according to claim 1 wherein said control circuit automatically resets the system to enable vehicle operation if the distance between the first control device on the vehicle and the second control device becomes less than said predetermined distance.

9. An anti-theft system according to claim 1 wherein said second control device includes control means operable by the wearer of the second control device for, when activated, disabling, after passage of a predetermined time period, the vehicle and all vehicle power options.

10. An anti-theft system according to claim 1 wherein said system includes an override function operable by the wearer of the second control device to enable operation of the vehicle when in park, the system providing for automatic disabling of at least one vehicle function when the vehicle is taken out of park and the vehicle is more than said predetermined distance from the second control device.

11. An anti-theft system according to claim 1 wherein control circuit further includes control means, remotely operable by the wearer of the second control device, for disabling at least one further electrically controlled onboard device when the vehicle operation is disabled.

12. An anti-theft system according to claim 11 wherein said at least one onboard device comprises at least one of vehicle communication equipment, a siren, an onboard computer and an electrically operated gun rack.

13. An anti-theft system according to claim 1 wherein said control circuit includes control means, remotely operable by the wearer of the second control device, for enabling at least one electrically controlled onboard device when the vehicle operation is enabled.

14. An anti-theft system according to claim 13 wherein said at least one onboard device comprises at least one of emergency light bars, emergency signaling device, a camera system, and a recording device.

15. An anti-theft system according to claim 1 wherein said characteristic signal and said return signal both comprise radio signals.

16. A system for preventing a vehicle protected by the system from being driven away by unauthorized persons, said system comprising:
a first electronic control device, adapted to be mounted in a vehicle to be protected, for controlling continued operation of the vehicle after the vehicle is started, said first control device including a transmitter and receiver for transmitting a characteristic radio frequency signal; and a second electronic control device adapted to be worn by a person authorized to use the vehicle to be protected and including a transmitter and receiver for receiving said characteristic signal and for, in response thereto, immediately transmitting a return radio frequency signal to the transmitter and receiver of the first control device;

said first electronic control device including a control circuit for calculating the distance between the first and second control devices based on the returned signal to produce a calculated distance, for comparing the calculated distance with a predetermined distance and for disabling vehicle operation when said calculated distance is greater than said predetermined distance, said control circuit also disabling vehicle operation when a return signal is not received from said second control device.

17. A system according to claim 16 wherein said control circuit includes a relay, including relay contacts connected in the electrical system of the vehicle, for, when energized, opening said contacts to open the vehicle electrical system.

18. A system according to claim 17 wherein said electrical system includes an ignition circuit and wherein said relay contacts are connected in the ignition circuit to control disconnection of the ignition circuit.

19. A system according to claim 17 wherein said electrical system includes fuel injector control circuit and wherein said relay contacts are connected in said fuel injector control circuit so as to control operation of the vehicle fuel injectors.

20. A system according to claim 17 wherein said electrical system includes a power supply circuit for the fuel supply system of the vehicle and wherein said relay contacts control opening of said power supply circuit.

* * * * *